(12) United States Patent
Luo

(10) Patent No.: US 7,299,524 B2
(45) Date of Patent: Nov. 27, 2007

(54) HINGE ASSEMBLY FOR ELECTRONIC DEVICE

(75) Inventor: Pu Luo, Shenzhen (CN)

(73) Assignees: Hong Fu Jin Precision Industry (Shenzhen) Co., Ltd., Bao-an District, Shenzhen, Quangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/177,964

(22) Filed: Jul. 8, 2005

(65) Prior Publication Data

US 2006/0010648 A1    Jan. 19, 2006

(30) Foreign Application Priority Data

Jul. 16, 2004    (CN) .................. 2004 2 0071822 U

(51) Int. Cl.
*E05F 1/08*    (2006.01)

(52) U.S. Cl. .......................................... 16/303; 16/330

(58) Field of Classification Search ............... 16/303, 16/330, 304–306, 329, 331; 455/575.1, 575.3; 379/433.15, 434; 361/683, 803
See application file for complete search history.

(56) References Cited

U.S. PATENT DOCUMENTS 6,633,643 B1 * 10/2003 Ona ..................... 379/433.13
6,678,539 B1 * 1/2004 Lu ......................... 455/575.1
6,985,759 B2 * 1/2006 Ona ........................ 455/575.3
7,085,375 B2 * 8/2006 Katoh .................... 379/433.13
2003/0162509 A1 * 8/2003 Bae et al. .................... 455/90
2004/0237259 A1 * 12/2004 Huang et al. ................ 16/330
2004/0261224 A1 * 12/2004 Li et al. ...................... 16/330

FOREIGN PATENT DOCUMENTS

CN    03100445.8    7/2003
TW    092209565    * 1/2004

* cited by examiner

*Primary Examiner*—James R. Brittain
*Assistant Examiner*—Ruth C. Rodriguez
(74) *Attorney, Agent, or Firm*—Morris Manning Martin LLP; Tim Tingkang Xia, Esq.

(57) ABSTRACT

A hinge assembly includes a hollow housing (100), a shaft (300), an urging mechanism (400), a cam (500), and a cylindrical follower (700). The housing includes an open end, and a hole (104) in an opposite second end. A peripheral wall of the housing at the open end defines a pair of pinholes (112). The shaft 300 includes a fixing portion. The urging mechanism is received in the housing and located around the shaft. The cam defines a cam hole (506) therethrough, and includes a cam portion (502) received in the housing. One end of the cam portion has a cam surface (508). The cam hole engagingly receives the shaft, so that the cam rotates with the shaft. The opposite end of the urging mechanism biases the cam. The follower is retained in the pinholes. The follower rotates relative to the shaft and is movably engaged with the cam surface.

11 Claims, 6 Drawing Sheets

HINGE ASSEMBLY FOR ELECTRONIC DEVICE

CROSS-REFERENCE TO RELATED APPLICATIONS

The present application is related to co-pending patent applications entitled "HINGE ASSEMBLY WITH UNIVERSALLY BIASED CAM" filed on Sep. 28, 2004 with the application Ser. No. 10/952,083, and "HINGE ASSEMBLY WITH CAMMED DRIVING" filed on Sep. 28, 2004 with the application Ser. No. 10/951,512 assigned to the same assignee as the present application. The disclosure of the above identified applications is incorporated herein by reference.

FIELD OF THE INVENTION

The present invention relates to hinge assemblies, and particularly to a hinge assembly for foldable electronic devices such as mobile telephones, electronic notebooks, and so on.

BACKGROUND

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly welcome by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and weight of portable foldable electronic devices. Thus, it is desirable that the hinge assembly coupling the main housing with the cover is modularized and miniaturized. A modularized hinge assembly has moving parts such as a cam member, a cam follower and a spring held together in a unified structure. The structure is easily and quickly attached to the main housing and the cover during mass production. A miniaturized hinge assembly has as few parts as possible, with the parts being as small as practicable.

One kind of portable cellular foldable electronic device with a hinge assembly is described in P.R. China Patent Application No. 03100445.8 published on Jul. 30, 2003. Referring to FIG. 6, the hinge assembly includes a housing 20, a rotary member 30, a rotary shaft 40, a moving part 50, and an elastic element 60. The housing 20 has a hole in one end thereof, and an opposite open end. The rotary member 30 has a connecting portion 31 and a cam follower 32. The connecting portion 31 defines a groove 33. A connecting wall (not shown) protrudes from the bottom of the groove 33. The connecting wall includes four fan-shaped walls (not shown). The rotary shaft 40 has a first portion 41 with a larger diameter, a flange 42, a second portion 43 with a smaller diameter, and a latching portion 44. The moving part 50 includes a sidewall 51, and a cam portion 52 engaging with the cam follower 32. The elastic element 60 is received in the housing 20, and pushes the moving part 50 toward the rotary member 30. The rotary shaft 40 passes through the hole of the housing 20, the elastic element 60, the moving part 50 and the rotary member 30 in that order. Then, the rotary shaft 40 is securely connected with the rotary member 30 by the connection between the latching portion 44 and the fan-shaped walls.

Although suitable for some foldable electronic devices, the above-described hinge assembly is not suitable for certain miniaturized foldable electronic devices. This is because the housing 20 of a miniaturized foldable electronic device may not have sufficient bulk to sturdily withstand the forces generated from the spring. In addition, the structure of the rotary member 30 of the hinge assembly is complicated and the volume of the rotary member 30 is large. This means that the longitudinal size of the hinge assembly is increased, and hence the volume of the foldable electronic device is increasing. Furthermore, the structure of the rotary shaft 40 is complicated, which increases the manufacturing costs of the hinge assembly.

What is needed, therefore, is a hinge assembly which has a relatively simple and small modularized configuration, and which can be produced at low cost.

SUMMARY

A hinge assembly for joining a cover to a main body of a foldable electronic device, comprises a hollow housing, a shaft comprising a fixing portion extending out of the housing through the hole, an urging mechanism, a cam and a follower. The housing comprises an open end, a hole in an opposite second end, and a peripheral wall of the housing defining a pair of opposite pinholes adjacent to the open end. The urging mechanism is received in the housing and located around the shaft. One end of the urging mechanism abuts the second end of the housing. The cam comprises a cam portion received in the housing and defines a cam hole extending through thereof. One end of the cam portion has a cam surface. The cam hole engagingly receives the shaft and rotates with the shaft and an opposite end of the urging mechanism biases the cam. The follower essentially is in the shape of a cylinder and retained in the pinholes of the housing. The follower rotates relative to the shaft, and movably engages with the cam surface.

A main advantage of the hinge assembly is that the longitudinal size of the hinge assembly is reduced. In addition, the volume and weight of the hinge assembly is reduced because of the cylindrical follower. Accordingly, the space required in an application such as a mobile phone is reduced. Furthermore, the hinge assembly is modularized, which makes it convenient for mass assembly of portable electronic devices.

Other objects, advantages and novel features will become more apparent from the following detailed description when taken in conjunction with the accompanying drawings, in which:

DETAILED DESCRIPTION OF PREFERRED EMBODIMENTS

Figure 1:
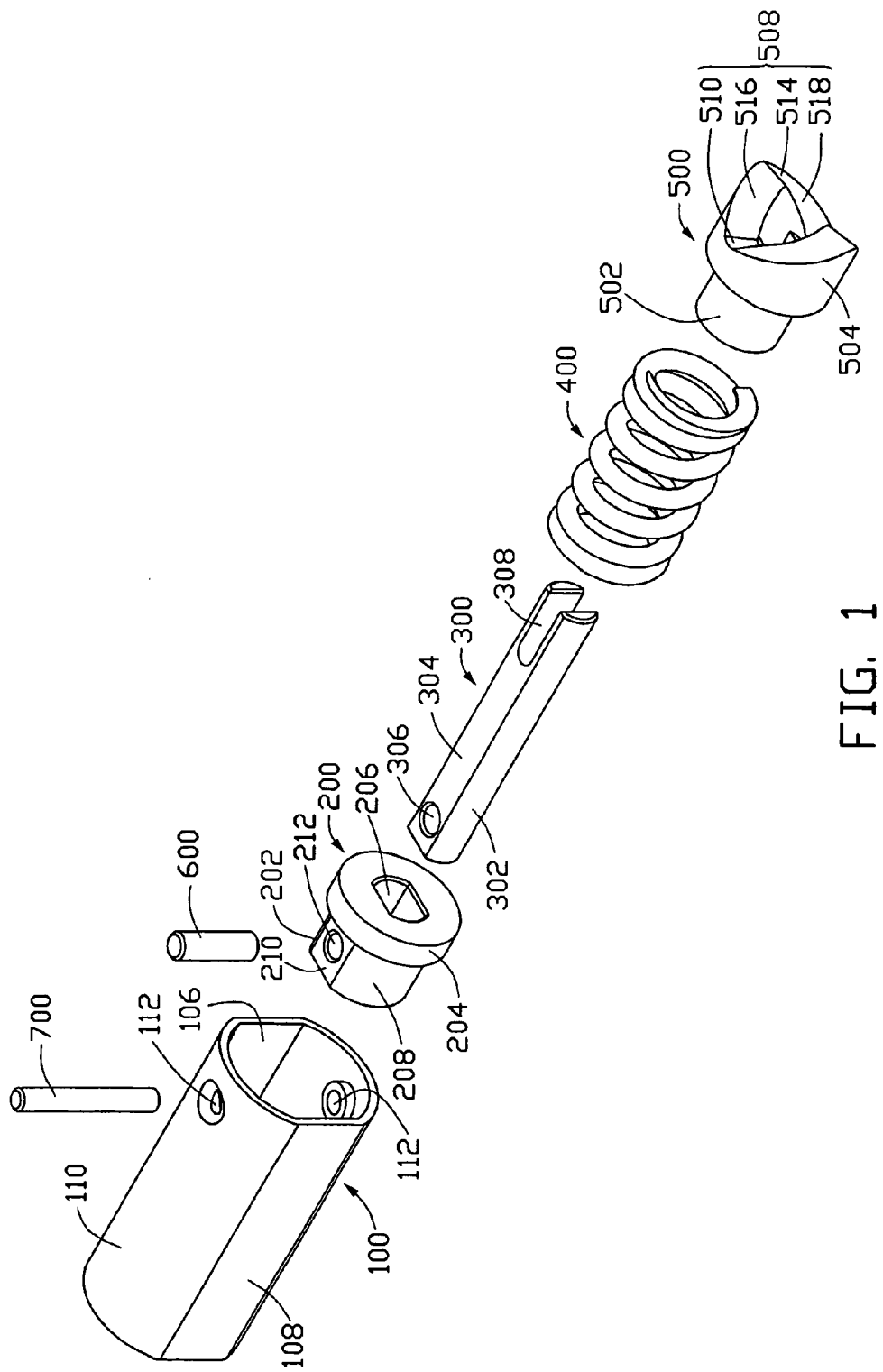
FIG. 1 is an exploded, isometric view of a hinge assembly according to a preferred embodiment of the present invention.
Figure 2:
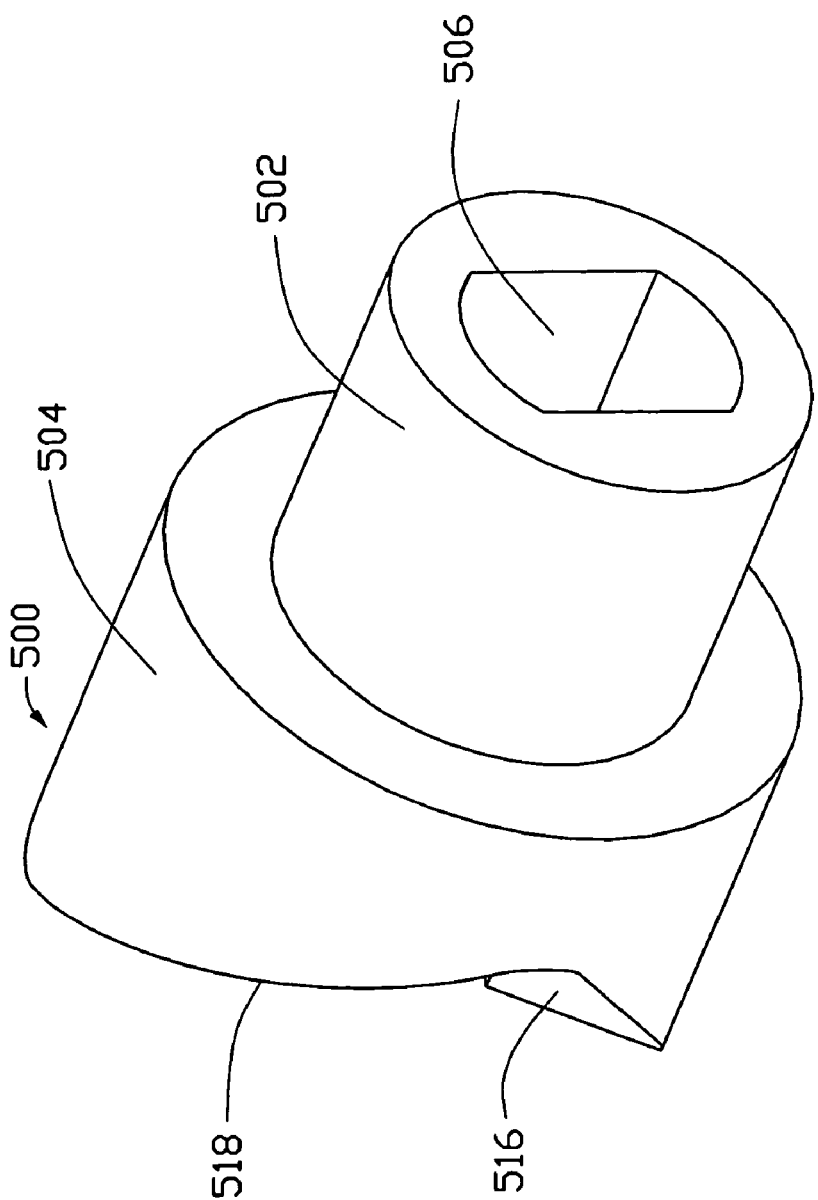
FIG. 2 is an enlarged, isometric view of a cam of the hinge assembly of FIG. 1.
Figure 3:
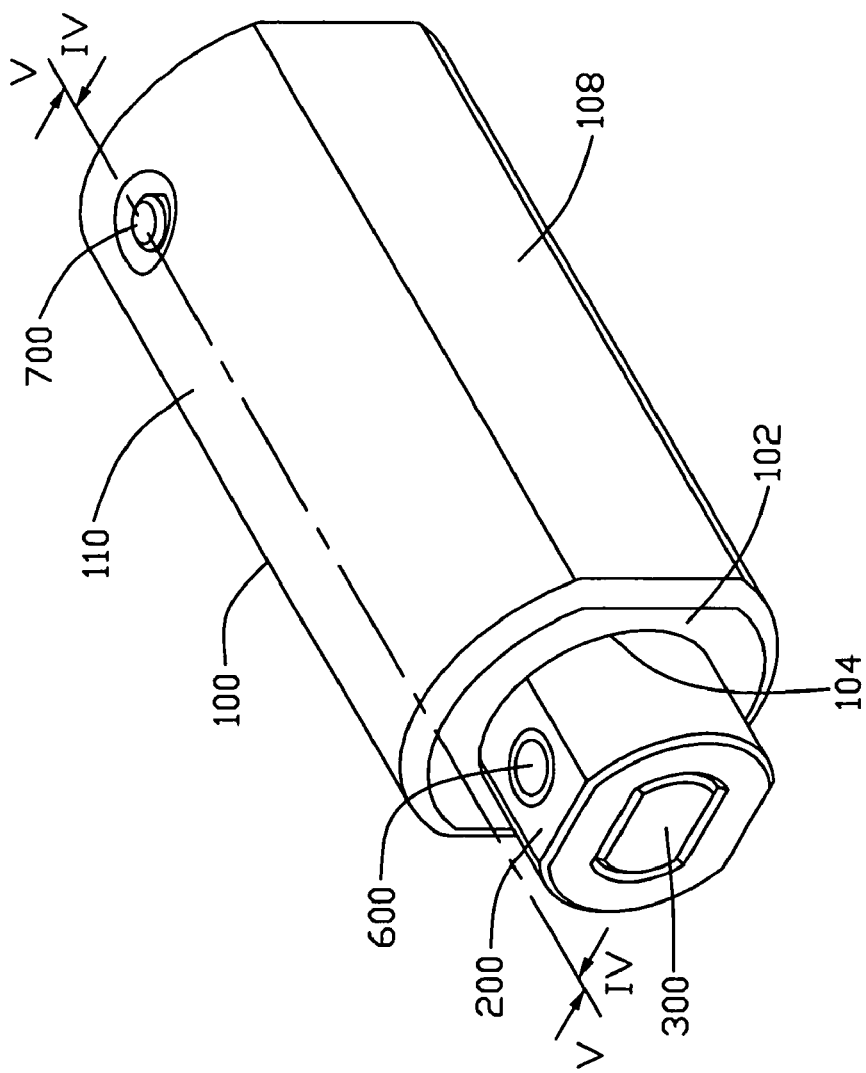
FIG. 3 is an assembled view of the hinge assembly of FIG. 1, but viewed from another aspect, and showing the hinge assembly in a first position corresponding to a closed position of a foldable electronic device.

FIG. 3 shows a hinge assembly according to the preferred embodiment of the present invention. The hinge assembly 2 is used to interconnect components like a body (not shown) and a cover (not shown) of a foldable electronic device. Also referring to FIGS. 1 and 2, the hinge assembly 2 includes a housing 100, a fixed member 200, a shaft 300, a spring 400 functioning as an elastic element, a cam 500, a pin 600, and a follower 700. The shaft 300 extends through the housing 100, the fixed member 200, the elastic element 400, the cam 500 and the follower 700, thereby integrating the hinge assembly 2 into a complete unit.

The housing 100 is generally a hollow cylinder. The housing 100 is partly closed off at a rear end and open at a front end thereof, thus forming a rear wall 102 at the rear end and an open end (not labeled) at the front end. The rear wall 102 defines a central hole 104, for the shaft 300 to extend through. The housing 100 defines a cavity 106, and includes a pair of opposite planar sidewalls 108 and a pair of opposite arcuate sidewalls 110. The planar sidewalls 108 enable the housing 100 to be easily engaged in the cover of the foldable electronic device. A pair of opposite pinholes 112 are defined through the arcuate sidewalls 110 of the housing 100 adjacent the open end. The pinholes 112 are aligned with each other. The housing 100 is made of plastic material.

The fixed member 200 includes a securing portion 202 functioning as an engaging portion, a discoid head 204 functioning as a stopper portion, and a hole 206 defined through the securing portion 202 and the discoid head 204. The securing portion 202 is integrally formed with the discoid head 204. The securing portion 202 includes two opposite arcuate faces 208 and two opposite planar faces 210. The planar faces 210 of the securing portion 202 enable it to be easily engaged in the main body of the foldable electronic device. A pair of opposite pinholes 212 are defined through the arcuate faces 210 of the securing portion 202. The pinholes 212 are aligned with each other.

The shaft 300 is a generally cylindrical body with two opposite arcuate sides 302 and two opposite planar sides 304. The shape of the shaft 300 corresponds to the hole 206 of the fixed member 200. A diameter of the shaft 300 is smaller than an inner diameter of the spring 400. The shaft 300 defines a through hole 306 in one end thereof, the through hole 306 spanning between the planar sides 304. The through hole 306 has a diameter corresponding to a common diameter of the pinholes 212 of the fixed member 200. The shaft 300 defines a generally U-shaped notch 308 in an opposite end thereof, and the notch 308 extending between the planar sides 304.

The spring 400 is metallic and helical, with an outer diameter smaller than an inner diameter of the housing 100. The spring 400 is placed around the shaft 300. One end of the spring 400 resists the discoid head 204 of the fixed member 200, and the other end of the spring 400 resists the cam 500.

The cam 500 includes a shaft portion 502, a cam portion 504 and a cam hole 506 defined through the shaft portion 502 and the cam portion 504. The shaft portion 502 is a generally cylindrical body. A diameter of the shaft portion 502 is smaller than an inner diameter of the spring 400. The cam portion 504 has a cam surface 508. The cam surface 508 includes two valleys 510, two peaks 514, two steep inclined planes 516, and two moderate inclined planes 518. Preferably, the valleys 510 are located 180 degrees from each other, and the peaks 514 are located 180 degrees from each other. The cam portion 504 has a diameter smaller than the inner diameter of the housing 100, and larger than the diameter of the shaft portion 502.

The pin 600 is cylindrical, and has a diameter corresponding to a common diameter of the pinholes 212 and the through hole 306. In the preferred embodiment, the pin 600 has a diameter slightly larger than the diameter of the pinholes 212, 306, so that the pin 600 can be inserted into and interferingly fixed with the fixed member 200 and the shaft 300.

The follower 700 is cylindrical, and functions as a positioning member. The shape and size of the follower 700 correspond to the shape and size of the pinholes 112 of the housing 100. The follower 700 engages in the pinholes 112. This is so that when the follower 700 is engaged with housing 100, the follower 700 cannot rotate about the housing 100. The follower 700 also engages with the cam surface 508 of the cam portion 504 of the cam 500.

In assembly of the hinge assembly 2, firstly, the fixed member 200 is received in the cavity 106 of the housing 100 from the open end, with the securing portion 202 extending out of the rear end of the housing 100 via the hole 104, and the discoid head 204 abutting the rear wall 102. Secondly, the shaft 300 is received in the housing 100 from the open end, and is extended through the shaft hole 206 of the fixed member 200. The through hole 306 aligns with the pinholes 212 of the fixed member 200, and with one end of the pin 600 being substantially coplanar with one end of the fixed member 200. Thirdly, the pin 600 is inserted into and securely engaged in the pinholes 212 of the fixed member 200 and the through hole 306 of the shaft 300. Preferably, the pin 600 is interferingly engaged in the pinholes 212. More preferably, the pin 600 is also interferingly engaged in the through hole 306. Fourthly, the spring 400 and the cam 500 are sequentially received in the housing 100 and placed around the shaft 300. One end of the spring 400 resists the discoid head 204 of the fixed member 200, and the other end of the spring 400 is located around the shaft portion 502 of the cam 500. The cam 500 is urged to compress the spring 400, so that the cam portion 504 is received in the housing 100. Lastly, the follower 700 is interferingly fixed in the pinholes 112, with opposite ends of the follower 700 being substantially coplanar with outer surfaces of the arcuate sidewalls 110 of the housing 100. Thus the follower 700 locks the combined shaft 300, spring 400 and cam 500 in the housing 100. When the urging of the cam 500 is released, the spring 400 urges the cam portion 504 toward the open end of the housing 100, but the cam portion 504 is blocked by the follower 700 and thus retained in the housing 100. The cam surface 508 of the cam portion 504 always contacts the follower 700 no matter what rotational position the cam portion 504 is in, because of the urging force of the spring 40. The hinge assembly 2 is thus completely assembled, as shown in FIG. 3.

Figure 5:
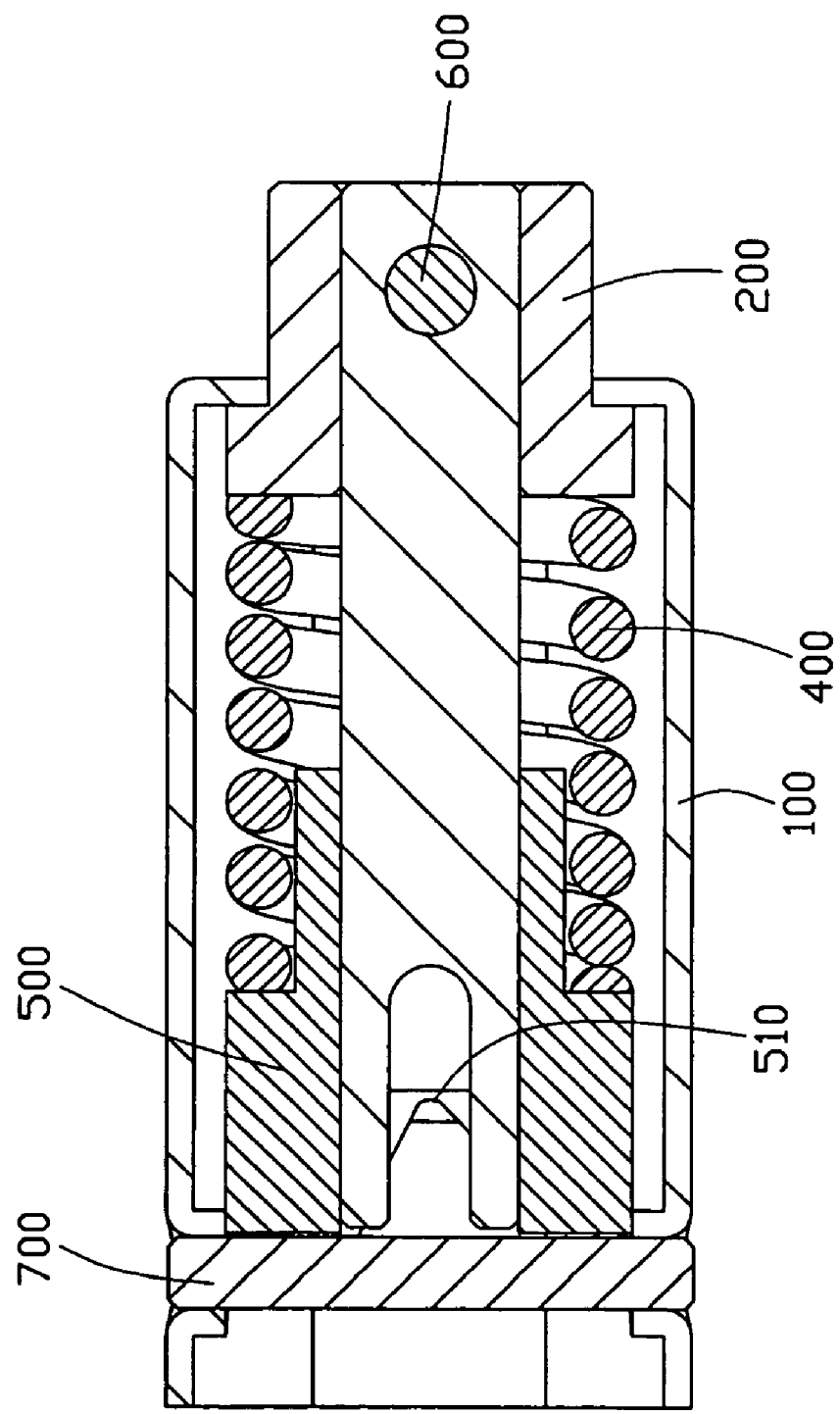
FIG. 5 is a cross-sectional view corresponding to line V-V of FIG. 3, whereby the hinge assembly is shown in a second position.

Referring to FIG. 5, in use, the housing 100 is engaged in a cavity (not shown) of the cover of the foldable electronic device, and the securing portion 202 of the fixed member 200 is engaged in the main body of the foldable electronic device. When the cover of the foldable electronic device is in a fully closed position, the follower 700 is located in the valleys 510 of the cam 500 and engages with the valleys 510.

Figure 4:
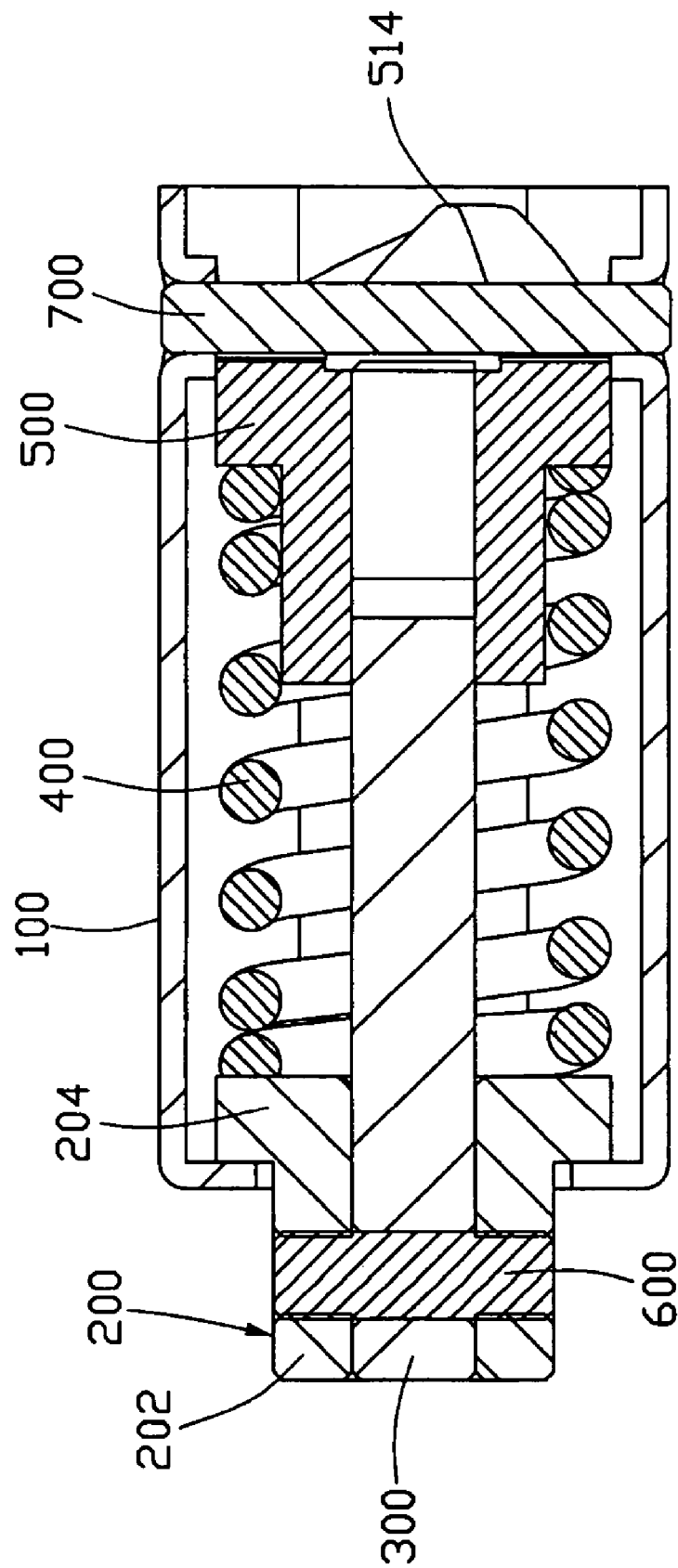
FIG. 4 is a cross-sectional view taken along line IV-IV of FIG. 3.
Figure 6:
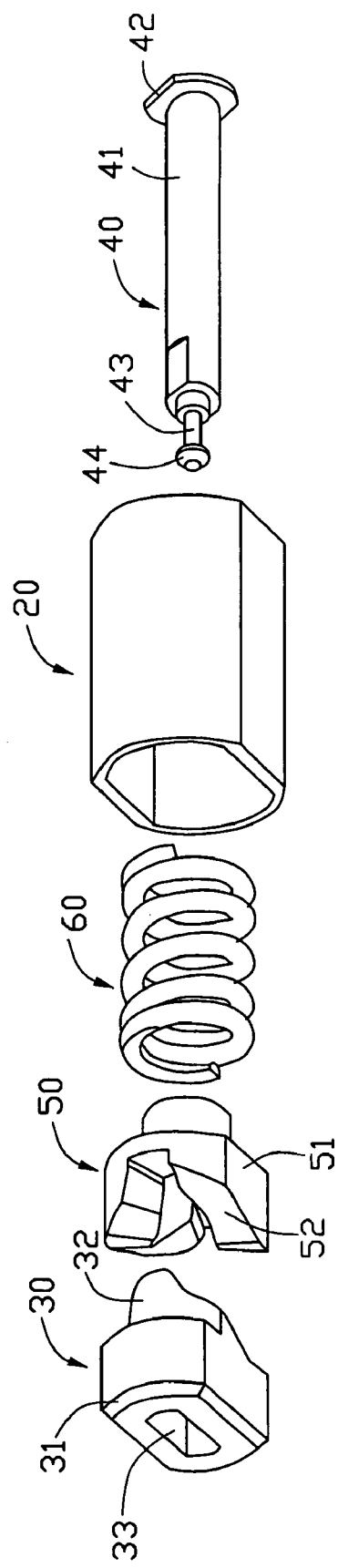
FIG. 6 is an exploded, isometric view of a conventional hinge assembly.

Referring to FIG. 6, when the cover of the foldable electronic device is rotated between an open position and a closed position, or vice versa, the housing 100 rotates along with the cover, while the shaft 300 remains fixed in the main body of the foldable electronic device. The follower 700 rotates along with the housing 100. As a result, the follower 700 rides along the steep inclined planes 516 of the cam surface 508 from the valleys 510 to the peaks 514 (see FIG. 4), with the cam 500 moving toward the spring 400 and compressing the spring 400. Once the follower 700 passes over the peaks 514, the spring 400 decompresses and drives the cam 500 back toward the follower 700, with the follower 700 riding along the moderate inclined planes 518 from the peaks 514 to the valleys 510. The cover is thus opened automatically to a fully open position or closed position under the decompression force of the spring 400. Accordingly, the cover is moved 180 degrees relative to the main body, with the follower 700 once again mating with the valleys 510. In this way, the cover is closed or opened. Preferably, the structures of the cover and the main body are adapted to control the degree of rotation of the hinge assembly, such that the follower 700 can be held in one or more particular locations between the valleys 510 and the peaks 514.

In an alternative embodiment, the fixed member 200 may be integrally formed with the shaft. In this case, the securing portion 202 of the fixed member 200 is replaced by a fixing portion disposed on one end of the shaft 300. The fixing portion is integrally formed with the shaft 300, and the stopper portion with a larger diameter than that of each of the fixing portion and the shaft 300 is disposed adjacent the fixing portion. The stopper portion abuts the rear wall 102 of the housing 100 and is constrained by the rear wall 102 of the housing 100 from moving out of the housing 100 through the hole 104. The fixing portion extends out of the housing 100 through the hole 104 and engages with the cover of the foldable electronic device. In another alternative embodiment, the U-shaped notch 308 can be omitted. In yet another alternative embodiment, the shaft portion 502 of the fixed member 500 can be omitted.

In further alternative embodiments, the follower 700 can be melted in the pinholes 112 of the housing 100 so that the follower 700 is firmly engaged in the housing 100. The spring 400 can be replaced by another kind of elastic element or urging mechanism known in the art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A hinge assembly for joining a cover to a main body of a foldable electronic device, comprising:
    a hollow housing comprising an open first end, and a hole in an opposite second end, a peripheral wall of the housing defining a pair of opposite pinholes at the first end;
    a fixed member comprising a securing portion extending out of the housing through the hole, and a hole extending therethrough, the securing portion being a generally cylindrical body but with at least one planar face for fixing the fixed member in the main body, and the at least one planar face defining a pinhole extending therethrough;
    a shaft securely connected with the fixed member, wherein the shaft is a generally cylindrical body with two opposite arcuate sides and two opposite planar sides, and the shaft defines a through hole at one end thereof, the through hole extending through the planar sides;
    an elastic element received in the housing and located around the shaft, one end of the elastic element abutting the fixed member;
    a cam received in the housing, the cam defining a cam hole extending therethrough and comprising a cam portion, one end of the cam portion having a cam surface, the cam hole engagingly receiving the shaft, an opposite end of the elastic element biasing the cam; and
    a follower essentially in the shape of a cylinder and retained in the pinholes of the housing, the follower being rotatable relative to the shaft and movably engaged with the cam surface.

2. The hinge assembly as claimed in claim 1, further comprising a pin, the pin being securely engaged in the pinholes of the fixed member and the through hole of the shaft.

3. The hinge assembly as claimed in claim 1, wherein the housing is generally cylindrical but with at least one planar sidewall, for fixing of the housing in the cover.

4. The hinge assembly as claimed in claim 1, wherein the follower is interferingly engaged in the pinholes.

5. The hinge assembly as claimed in claim 1, wherein the cam further comprises a shaft portion integrally formed with the cam portion.

6. The hinge assembly as claimed in claim 5, wherein the elastic element is a helical spring located around the shaft portion.

7. The hinge assembly as claimed in claim 1, wherein the fixed member further comprises a discoid head integrally formed with the securing portion, one end of the discoid head abuts the opposite second end of the housing, and the other end of the discoid head abuts the elastic element.

8. A hinge assembly for a portable electronic device, comprising:
    a housing comprising a cavity communicating with an outside of the housing from one end thereof, the housing being adapted to be attached to a first part of the portable electronic device, and a peripheral wall of the housing defining a pair of opposite pinholes at the end of the housing;
    a shaft rotatably and partially received in the cavity of the housing and having an engaging portion extending out of the housing from the end of the housing, whereby the engaging portion can be attached to a second part of the portable electronic device, thereby allowing the second part of the portable electronic device to rotate relative to the first part of the portable electronic device, and wherein the engaging portion of the shaft is integrally formed with a fixed member separate from the shaft and mechanically fixed to the shaft through a pin in order to confine the shaft to move together with the fixed member and the integrally-formed engaging portion thereof;

an elastic element;

a cam comprising a cam portion; and a positioning member interferingly fixed in the pinholes of the housing, the positioning member being used to confine the cam in the cavity, the positioning member partially engaging with the cam portion of the cam, the elastic element being received in the housing to maintain a pressured engagement between the positioning member and the cam portion of the cam, the cam being movable along an axial direction of the shaft when the positioning member drives the cam portion along a direction perpendicular to the axial direction.

9. The hinge assembly as claimed in claim 8, wherein the shaft further comprises a stopper portion, which is constrained by the end of the housing from moving out of the housing through the end of the housing.

10. The hinge assembly as claimed in claim 8, wherein the shaft further defines a U-shaped notch in an end thereof next to the cam, and the positioning member is able to move into the notch when the positioning member engages with the cam portion of the cam.

11. The hinge assembly as claimed in claim 10, wherein the engaging portion of the shaft extends from another end of the shaft opposite to the end of the shaft having the U-shaped notch.

* * * * *